US008255519B2

(12) United States Patent  (10) Patent No.: US 8,255,519 B2
Allen et al.  (45) Date of Patent: Aug. 28, 2012

(54) NETWORK BOOKMARKING BASED ON NETWORK TRAFFIC

(75) Inventors: Robbie Allen, Cary, NC (US); Marisa Chancellor, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 11/870,373

(22) Filed: Oct. 10, 2007

(65) Prior Publication Data

US 2009/0100169 A1  Apr. 16, 2009

(51) Int. Cl.
  *G06F 15/173* (2006.01)
(52) U.S. Cl. ........ 709/224; 709/223; 709/226; 370/229; 370/230
(58) Field of Classification Search .................. 709/238
  See application file for complete search history.

(56) References Cited

U.S. PATENT DOCUMENTS

| | | | |
|---|---|---|---|
| 6,393,479 B1* | 5/2002 | Glommen et al. | 709/224 |
| 6,643,696 B2* | 11/2003 | Davis et al. | 709/224 |
| 7,385,924 B1* | 6/2008 | Riddle | 370/235 |
| 7,398,271 B1* | 7/2008 | Borkovsky et al. | 1/1 |
| 7,639,613 B1* | 12/2009 | Ghannadian et al. | 370/232 |
| 2002/0021665 A1* | 2/2002 | Bhagavath et al. | 370/229 |
| 2003/0217113 A1* | 11/2003 | Katz et al. | 709/213 |
| 2003/0225885 A1* | 12/2003 | Rochberger et al. | 709/226 |
| 2004/0085906 A1* | 5/2004 | Ohtani et al. | 370/248 |
| 2005/0149619 A1* | 7/2005 | Cowan et al. | 709/207 |
| 2005/0198268 A1* | 9/2005 | Chandra | 709/224 |
| 2006/0155694 A1* | 7/2006 | Chowdhury et al. | 707/4 |
| 2007/0043745 A1 | 2/2007 | Rojer | |
| 2007/0157316 A1* | 7/2007 | Devereux et al. | 726/24 |
| 2007/0201359 A1* | 8/2007 | Matsubara et al. | 370/230 |
| 2007/0244857 A1* | 10/2007 | Yu | 707/3 |
| 2007/0294265 A1* | 12/2007 | Askew et al. | 707/100 |
| 2008/0195665 A1* | 8/2008 | Mason et al. | 707/104.1 |
| 2009/0092183 A1* | 4/2009 | O'Hern | 375/240.01 |
| 2009/0276377 A1* | 11/2009 | Dutta et al. | 706/12 |

OTHER PUBLICATIONS

Oakley Networks Sureview 5.0 Integrates Network and Desktop Insider Threat Detection and Remediation. Press Release [online]. Oakley Systems, 2007 [retrieved on Sep. 10, 2008]. Retrieved from the Internet: <URL: http://www.oakleynetworks.com/news/sureview_5.0.php>.

Netflow. Wikipedia, the free encyclopedia. [retrieved on Sep. 10, 2008]. Retrieved from the Internet: <URL: http://en.wikipedia.org/wiki/Netflow>.

(Continued)

*Primary Examiner* — Aaron Strange
*Assistant Examiner* — Natisha Cox
(74) *Attorney, Agent, or Firm* — Hickman Palermo Truong Becker Bingham Wong LLP

(57) ABSTRACT

A system comprises a packet data processing element; first network resource tracking logic operable to perform monitoring data packets as the packets pass through the network element; detecting network resource identifiers within the data packets; forming network resource identifier report messages that carry the network resource identifiers; forwarding the network resource identifier report messages to a bookmark processing server; storing records of each of the network resource identifiers carried therein; storing counters that identify numbers of times that associated network resource identifiers were requested; determining interesting network resource identifiers based on the records and decision steps; generating and providing a report of the interesting network resource identifiers. As one result, interesting network resource identifiers can be automatically found in network traffic and provided to a social bookmarking site.

25 Claims, 5 Drawing Sheets

OTHER PUBLICATIONS

Introduction to CISCO IOS NetFlow—A Technical Overview. Overview [online]. Cisco. 2007 [retrieved on Sep. 10, 2008]. Retrieved from the Internet: <URL: http://www.cisco.com/en/US/prod/collateral/iosswrel/ps6537/ps6555/ps6601/prod_white_paper0900aecd80406232.html>.

Boswell, Wendy. Google Zeitgeist. About.com: Web Search, Article [online], [retrieved on Sep. 10, 2008]. Retrieved from the Internet: <URL: http://websearch.about.com/od/dailywebsearchtips/qt/dnt0713.htm>.

Delicious (website). Wikipedia, the free encyclopedia. [retrieved on Sep. 10, 2008]. Retrieved from the Internet: <URL: http://en.wikipedia.org/wiki/Del.icio.us>.

Social Bookmarking. Wikipedia, the free encyclopedia. [retrieved on Sep. 10, 2008]. Retrieved from the Internet: <URL: http://en.wikipedia.org/wiki/Social_bookmarking>.

\* cited by examiner

FIG. 5

| 134 | | | | |
|---|---|---|---|---|
| 502 URL-Id | 504 URL | 506 Counter | 508 Metadata | 510 Time to live |
| 1023 | www.cisco.com | 4096 | (wbrs, +10), (age, 23:08:02), (del.icio.us, 05-May-2007 02:03:54) | 22:04:05:58 |
|  |  |  |  |  |
|  |  |  |  |  |
|  |  |  |  |  |

NETWORK BOOKMARKING BASED ON NETWORK TRAFFIC

TECHNICAL FIELD

The present disclosure generally relates to networked data processing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Social bookmarking websites allow users to save and tag URLs for future reference. An example of a social bookmarking website is the site "http://del.icio.us." With this type of site, a user can search on tags to locate bookmarks on a particular topic of interest. Another way users find bookmarks on these sites is by browsing the URLs that have been bookmarked the most by other users. For example, the above-referenced site has a URL ending in "popular/" that provides access to the most popular bookmarked URLs.

HTTP traffic monitoring systems are available from vendors such as Oakley Networks, AdventNet and Cisco Systems, Inc., San Jose, Calif. (Cisco Netflow). These products for security operations or for network operations and are not used for general purpose social bookmarking. HTTP traffic monitoring systems do not dynamically index the content of pages and associate tags with pages.

The Google search engine system has provided information on search patterns and trends in a facility known as "zeitgeist" functionality, as described in the file "zeitgeist.html" in the folder "/press" of the domain "google.com" on the World Wide Web.

BRIEF DESCRIPTION OF THE DRAWINGS

In the drawings:

FIG. 5 illustrates a data storage organization for a network resource identifier database in one embodiment;

DETAILED DESCRIPTION

Figure 1:
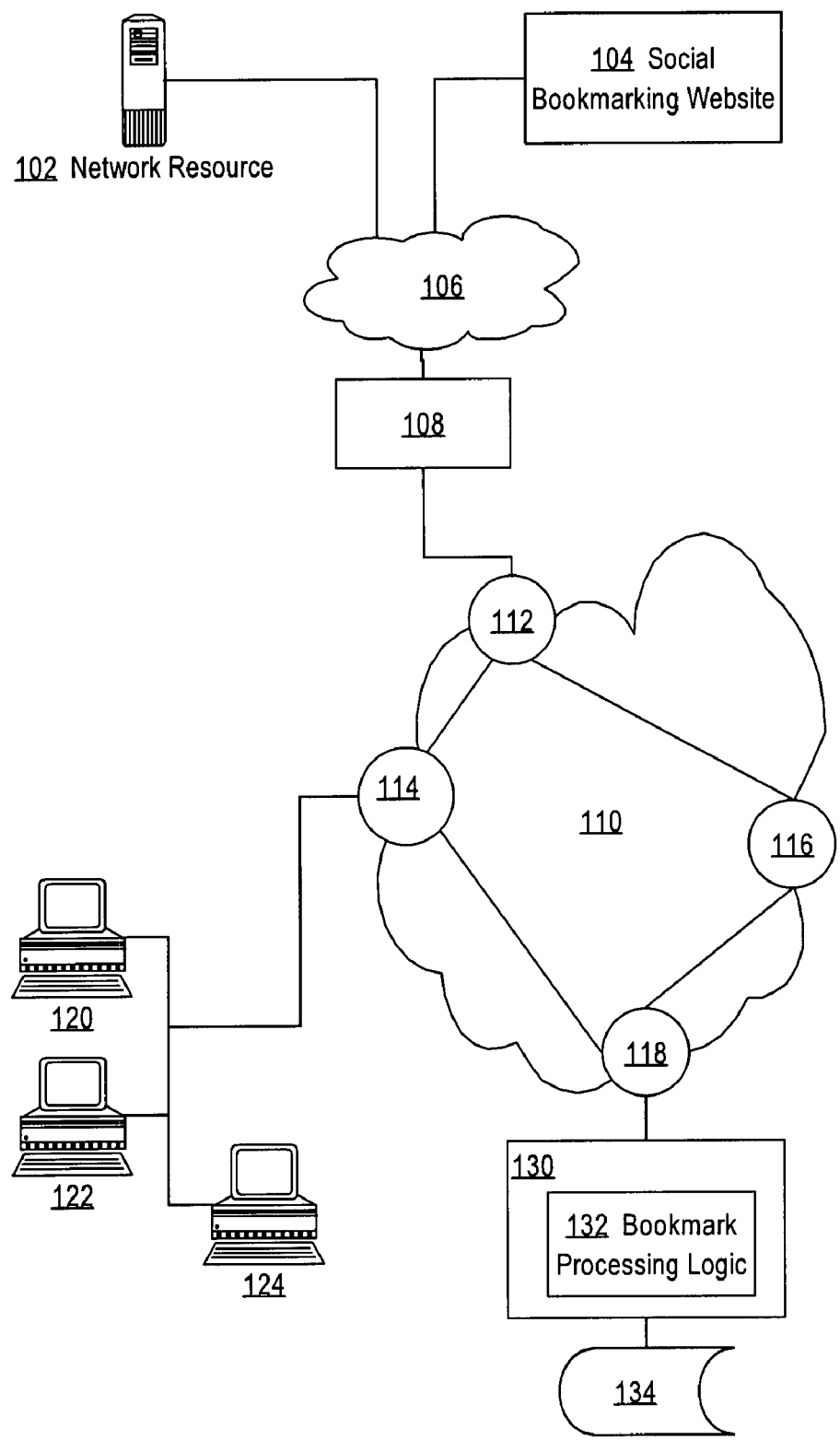
FIG. 1 illustrates a networked system in which network bookmarking based on network traffic may be implemented in one embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview Network bookmarking based on network traffic is described. In an embodiment, a data processing system comprises a first packet data processing element comprising one or more ingress network interfaces that are coupled to a data network for receiving one or more data packets therefrom; one or more egress network interfaces that are coupled to a data network for sending one or more data packets thereto; one or more processors; a packet switching system coupled to the one or more processors and to the ingress network interfaces and to the egress network interfaces and configured to receive one of the data packets from one of the ingress network interfaces, determine next hop for the one of the data packets, and forward the one of the data packets toward the next hop on a selected one of the egress interfaces; first network resource tracking logic encoded in a computer-readable storage medium for execution and when executed by the one or more processors operable to perform monitoring the one or more data packets as the one or more data packets pass through the data processing element; detecting one or more network resource identifiers within the one or more data packets; forming one or more network resource identifier report messages that carry the one or more network resource identifiers; forwarding the one or more network resource identifier report messages to a bookmark processing server; the bookmark processing server comprises bookmark processing logic encoded in a computer-readable storage medium for execution and when executed is operable to perform receiving the one or more network resource identifier report messages and storing one or more records of each of the one or more network resource identifiers carried therein; creating and storing counters in the records, the counters identify numbers of times that associated network resource identifiers were requested; determining one or more interesting network resource identifiers based on the records and one or more decision steps; generating and providing a report of the interesting network resource identifiers.

In an embodiment, the one or more decision steps comprise determining the highest counters.

In an embodiment, the bookmark processing logic further comprises logic which when executed causes creating and storing a list of excluded network resource identifiers, determining whether the one or more network resource identifiers carried in the one or more network resource identifier report messages are in the list of excluded network resource identifiers, and not storing the network resource identifiers when the one or more network resource identifiers carried in the one or more network resource identifier report messages are in the list of excluded network resource identifiers.

In an embodiment, the first network resource tracking logic comprises logic which when executed causes retrieving, for a particular one of the network resource identifiers, online content associated with the particular one of the network resource identifiers; identifying one or more words of interest in the online content; providing the one or more words of interest to the bookmark processing server in association with one of the network resource identifier report messages.

In an embodiment, the bookmark processing logic further comprises logic which when executed causes storing the one or more words of interest in a searchable data store; receiving user input specifying a search for one or more search terms;

searching the data store to identify one or more network resource identifiers associated with any of the one or more words of interest that match the one or more search terms; providing a report of the one or more network resource identifiers associated with any of the one or more words of interest that match the one or more search terms.

In an embodiment, the system further comprises a second packet data processing element coupled through the network to the first packet data processing element and comprising second network resource tracking logic encoded in a computer-readable storage medium for execution and when executed by the one or more processors operable to perform monitoring second one or more data packets as the second one or more data packets pass through the second data processing element; detecting other network resource identifiers within the second one or more data packets; forming one or more other network resource identifier report messages that carry the one or more other network resource identifiers; forwarding the one or more other network resource identifier report messages to the bookmark processing server.

In an embodiment, the system further comprises a plurality of other packet data processing elements coupled to the first packet data processing elements in other locations in the network and each configured to forward to the bookmark processing server one or more other network resource identifier report messages carrying one or more other network resource identifiers detected in other data packets passing through the other packet data processing elements.

In an embodiment, the bookmark processing server further comprises logic which when executed causes creating and sending to a social bookmarking website a request to enter a uniform resource locator (URL) into a data store of the social bookmarking website, where the request comprises one or more of the network resource identifiers.

In an embodiment, the network resource identifiers are uniform resource locators (URLs). In an embodiment, the first packet data processing element comprises any of a router, packet data switch, or message processing appliance.

In other embodiments, the invention encompasses a computer-readable medium configured to carry out the foregoing steps and a method that performs the functions described herein.

2.0 Structural and Functional Overview

In an embodiment, finding URLs that people might want to bookmark is automated by dynamically inspecting network traffic. In an embodiment, URLs for all HTTP traffic are collected and stored at a bookmark processing server. In an embodiment, URL tracking devices are spread around a network of an enterprise or network service provider. The URL tracking devices forward URL information to the bookmark processing server.

The bookmark processing server processes that aggregate metrics on usage of the URLs. When the metrics indicate that a particular URL is interesting, the bookmark processing server takes any of several responsive actions with respect to the URL. In an embodiment, the bookmark processing server generates a report, display or notification that identifies the interesting URL. In an embodiment, the bookmark processing server forms an HTTP POST message that includes the interesting URL, and sends the message to a social bookmarking website, causing the social bookmarking website to create an entry referring to the interesting URL. The message may include metadata relating to the URL as appropriate or allowed by the social bookmarking website.

In an embodiment, the URL tracking devices index the content for each web page for keywords. When a URL tracking device forwards a URL to the bookmark processing server, the URL tracking device provides the keywords that the indexer computed after parsing the page. The bookmark processing server stores the keywords for future use as tags that users can search on. The title of each page is also stored and can users can search against the title of the page.

In an embodiment, the bookmark processing server is configured to help customize the logic for which URLs are considered interesting. For example, by default, the list of unique URLs is weighted based on the number of times each URL has been visited; thus, the URLs are associated with a popularity value.

In another embodiment, a keyword list is configured, and the content indexer searches HTML of URLs in network traffic for the words in the keyword list. One such word might be "blog". In this example, by identifying all web pages that contain the word "blog" in either the page title or body, the bookmark processing server can show a list of the most popular "blogs" visited by users in the network.

The bookmark processing server stores a record for each unique URL. Highly popular URLs, such as the home page URL of popular search engines, are likely to be represented in the database of the bookmark processing server. However, URLs for specific searches performed at a search engine are not likely to be represented in the database, because the identical search is not likely to be performed often enough by a large enough population of users to qualify as popular or interesting.

Further, in an embodiment, well-known URLs are not considered interesting because many users already know the URL. In an embodiment, the URL tracking devices or the bookmark processing server are configured with an exclusion list of URLs that are not processed or stored in the database.

In another embodiment, the bookmark processing server determines and reports on patterns and trends in accessing URLs or in keywords within the HTML documents associated with the URLs. For example, all URLs that represent searches using a particular search engine are tracked, and the bookmark processing server determines and reports on the most popular search keywords that were used in the searches. As a result, a first user can see the most popular searches that are being performed by other users in the same network.

In an embodiment, by analyzing network traffic, the bookmark processing server identifies interesting web pages that users might want to bookmark continuously and dynamically. Tags may be associated with each URL in a database that the bookmark processing server manages, based on indexing content from the source page.

For any social networking application to be successful, a threshold amount of participation from the user community is necessary. With the public Internet, the user community comprises millions of persons and if only one percent of the community contributes content, the number is large enough that a system is useful to non-contributors. The present system is useful with business enterprise networks. Even the largest business enterprises typically have fewer than 100,000 total users, and therefore having one percent participation may not generate much interest among non-contributors. In an embodiment, content in the form of identified popular or interesting URLs is developed automatically so that low active user participation does not affect usefulness of the system. Thus, embodiments may be used by small business enterprises effectively even when only a few users actively contribute URLs through other means.

A benefit of the approach herein is that it captures actual usage of network resources. With traditional social bookmarking websites, individual users must manually add bookmarks. A particular user may visit a site frequently, yet never add the site as a bookmark, and therefore other users are not aware of the site. In the approach herein, network traffic is monitored and popular URLs are identified automatically.

An embodiment may be implemented in a network cache device. Alternatively, a network cache device may forward URL information to a separate appliance that has greater storage capacity. A data processing system that implements the approaches herein may comprise an application-oriented networking device, a router or switch that implements Application Network Services capabilities. Embodiments may be used to provide the ability to route requests to the optimal provider of a service or content based on concentration, frequency, and repetition of observed traffic flows and content between consumers and providers. Embodiments may store market data that is generated in the process. Embodiments may be implemented in any network product that has access to analytical information regarding traffic flows and content.

FIG. 1 illustrates a networked system in which network bookmarking based on network traffic may be implemented in one embodiment.

A network resource 102 and a social bookmarking website 104 are coupled to or logically located within a public network 106. An example of a network resource is a content server or content-based website, such as the website at the domain "cisco.com" in the World Wide Web. Network resources may comprise files, directories, folders, etc. The social bookmarking website 104 is a networked resource that enables users to input data about interesting network resource identifiers, such as Uniform Resource Locators (URLs) of other websites or network resources, to share information about the interesting network resource identifiers, and to maintain personal lists of network resource identifiers. An example of a social bookmarking website 104 is the site "http://del.icio.us".

The term "network resource identifiers" refers broadly to any identifier of a network resource including but not limited to a URL, Uniform Resource identifier (URI), pathname, directory name, filename, etc.

Public network 106 may comprise one or more local area networks, wide area networks, internetworks, or a combination. In one embodiment, public network 106 comprises the set of inter-connected internetworks that are popularly termed "Internet."

Network 106 is coupled to a private network 110 directly or indirectly through a gateway or firewall 108. In an embodiment, firewall 108 performs message processing and URL processing functions and acts as a messaging gateway and protective device that blocks or regulates spam, viruses, adware, spyware, and other threats that can enter the network 110 through e-mail or when users of network 110 request access to URLs. For example, firewall 108 may comprise the model S600 Messaging Gateway Appliance from IronPort Systems, Inc., San Bruno, Calif., which is owned by Cisco Systems, Inc., San Jose, Calif.

In various embodiments, the private network 110 is associated with a business organization, government organization, non-government organization, or network service provider. The private network 110 may be an enterprise network. In an embodiment, private network 110 comprises one or more routers or switches 112, 114, 116, 118 coupled by links. The links may comprise terrestrial wire links, wireless links, satellite links, etc. Any number of routers or switches 112, 114, 116, 118 may be used in various embodiments.

Examples of routers or switches 112, 114, 116, 118 include the Cisco 7500 Series Routers and Cisco Catalyst® 6000 Series Switches from Cisco Systems, Inc., San Jose, Calif.

In an embodiment, private network 110 comprises one or more computers 120, 122, 124 that are typically associated with individual users of the network. To illustrate a clear example, FIG. 1 shows three computers 120, 122, 124, but in other embodiments any number of computers may be used. The computers may comprise personal computers, workstations, wireless devices or PDAs, printers, scanners, or other input/output devices.

A bookmark processing server 130 is coupled to private network 110 or forms part of the private network. The bookmark processing server 130 comprises bookmark processing logic 132 and storage 134. Functions of the bookmark processing server are described further herein.

Figure 2:
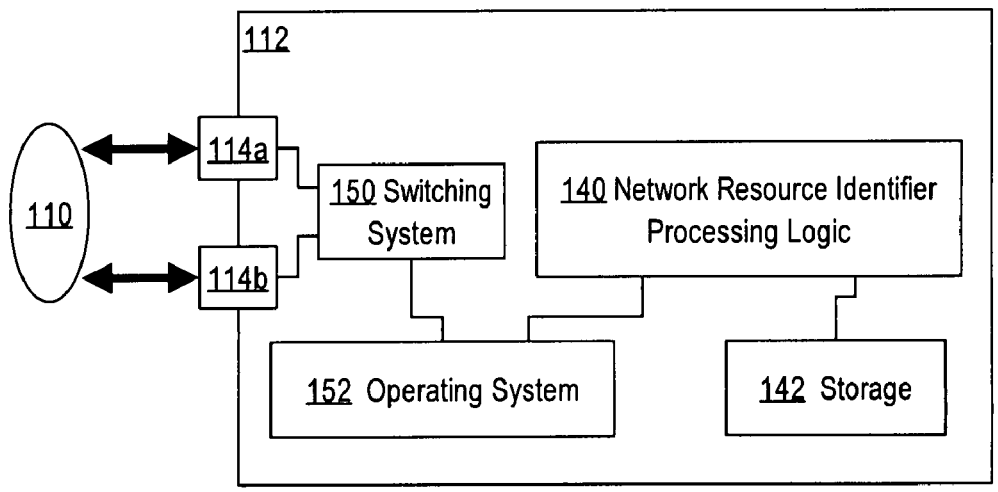
FIG. 2 illustrates a network element that includes network resource identifier processing logic in one embodiment.

FIG. 2 illustrates a network element that includes network resource identifier processing logic in one embodiment. In an embodiment, each of the routers or switches 112, 114, 116, 118 has the structure of FIG. 2. Thus, network 110 typically comprises a plurality of network elements having network resource identifier processing logic spread throughout the network in appropriate logical locations, so that all requests by the computers in the network and carrying network resource identifiers are captured for reporting to the bookmark processing server. Appropriate logical locations may vary in different embodiments but may include edge points or gateway locations at which the network interfaces to the public network 106, locations that include large numbers of client computers, etc.

As an example, network element 112 comprises one or more interfaces 114a, 114b, each which may serve as an ingress interface and/or an egress interface. The interfaces are coupled to links of the network 110 and can receive packets or packet flows from the network and can send packets or packet flows to the network 110 according to packet processing protocols and formats.

Network element 112 further comprises a switching system 150 configured to determine a next hop or other destination for a received packet and to produce instructions to the interfaces to route or switch packets from an ingress interface to an egress interface that has reachability to the next hop or other destination.

Network element 112 further comprises network resource identifier processing logic 140 and storage 142. In general, the network resource identifier processing logic 140 functions to identify network resource identifiers in packets or packet flows passing through network element 112 and to report the network resource identifiers to the bookmark processing server. The network resource identifier processing logic 140 can store network resource identifiers, messages, and metadata in storage 142 as part of performing the foregoing general functions. Storage 142 may comprise non-volatile storage such as NVRAM, flash memory or disk storage, or may comprise volatile read-write storage such as dynamic RAM. Further functions of the network resource identifier processing logic 140 and storage 142 are described further herein.

In an embodiment, network element 112 comprises an Application-Oriented
Networking (AON) blade and AONS software available from Cisco Systems, Inc.

Figure 3:
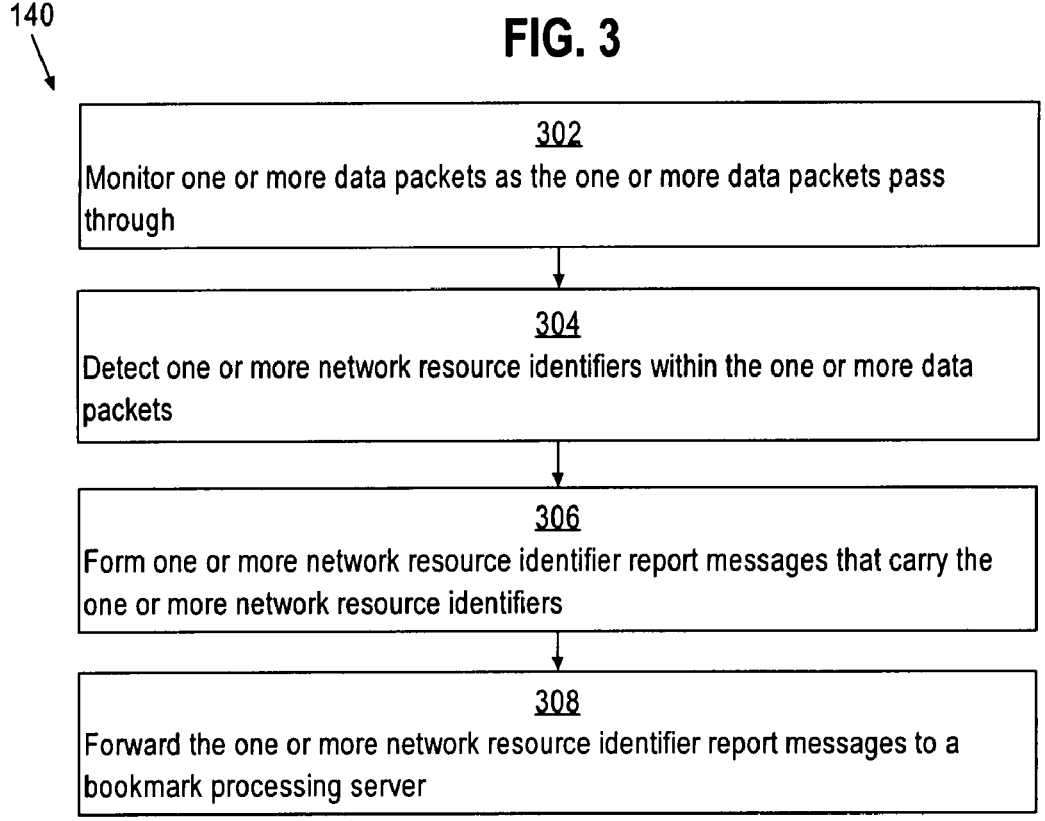
FIG. 3 illustrates identifying and reporting network resource identifiers based on network traffic in one embodiment.

FIG. 3 illustrates identifying and reporting network resource identifiers based on network traffic in one embodiment.

Step 302 comprises monitoring the one or more data packets as the one or more data packets pass through the data processing element. Step 304 comprises detecting one or more network resource identifiers within the one or more data packets. In an embodiment, in step 302 the network resource identifier processing logic receives a copy of packets arriving on ingress interfaces of the data processing element and assembles the packets into OSI Layer 5 or Layer 6 messages so that HTTP requests can be identified. In step 304, one or more URLs carried in an HTTP GET or POST request in the packets are identified and copies to storage. Other kinds of network resource identifiers may be identified and copied to storage. In an embodiment, the network resource identifiers are identified and copied in a "promiscuous mode" of operation so that the identification and copying does not affect communication of packets or forwarding, switching, or routing operations.

Identifying network resource identifiers may comprise parsing characters of HTTP request messages according to rules for forming URLs or URIs as stated in Internet standards. In an embodiment, messages are scanned to identify nested or encapsulated network resource identifiers. For example, network resource identifiers carried in an HTTP request as a string parameter value are identified.

Step 306 comprises forming one or more network resource identifier report messages that carry the one or more network resource identifiers. Step 308 comprises forwarding the one or more network resource identifier report messages to a bookmark processing server. In step 306, the network resource identifier processing logic forms a message that can report the contents of a URL, URI or other network resource identifier to the bookmark processing server and the message is sent or forwarded in step 308. The form of the message may vary in various embodiments. For example, the bookmark processing server 130 may comprise an HTTP server and the network resource identifier processing logic 140 can form an HTTP POST request that posts a message comprising the identified URL, URI or other network resource identifier to an application, database, or other system or logic in the bookmark processing server. Alternative, a specialized protocol or purpose-built protocol may be used.

In an embodiment, in step 306 or as part of another step, the network resource identifier processing logic 140 retrieves an electronic document associated with a network resource identifier that was detected at step 304, and indexes the content of the retrieved electronic document for keywords that are used within the electronic document. In an embodiment, as part of step 308, the network resource identifier processing logic 140 provides the keywords that the indexer computed after parsing the electronic document.

Figure 4:
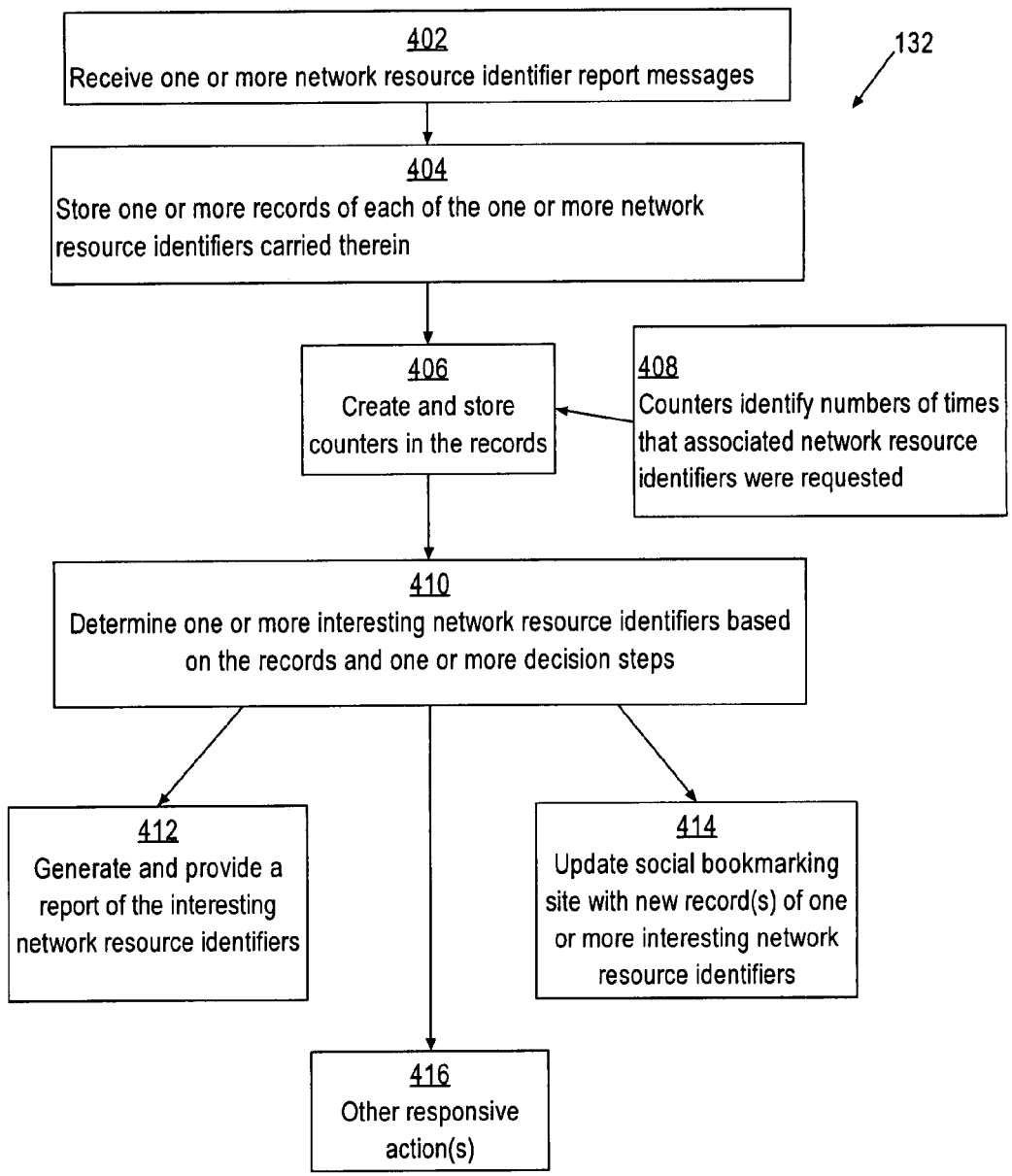
FIG. 4 illustrates automatically determining interesting network resource identifiers, in one embodiment.

FIG. 4 illustrates automatically determining interesting network resource identifiers, in one embodiment.

Step 402 comprises receiving the one or more network resource identifier report messages that were forwarded at step 308. For example, in the context of FIG. 1, bookmark processing logic 132 receives report messages from network resource identifier processing logic 140 in network element 112.

Step 404 comprises storing one or more records of each of the one or more network resource identifiers carried therein. For example, bookmark processing logic 132 stores records in database 134, and the records in the database include copies of the network resource identifiers. In an embodiment, the bookmark processing logic 132 also stores any keywords that are in the received report messages, for future use as tags that users can search on. The title of each page also may be stored so that users can search against the title of the page.

Step 406 comprises creating and storing counters in the records. As shown in step 408, the counters identify numbers of times that associated network resource identifiers were requested. For example, bookmark processing logic 132 stores the counters in records in database 134.

Step 410 comprises determining one or more interesting network resource identifiers based on the records and one or more decision steps. For example, bookmark processing logic 132 processes the records stored in the database and selects one or more network resource identifiers as interesting based on decision criteria. In an embodiment, the decision criteria comprise determining which network resource identifiers are most often accessed in a specified period of time. The period of time can range from a few seconds to one or more years and any other time period within that range.

In an embodiment, the decision criteria include using an exclusion list to exclude certain network resource identifiers from consideration. For example, the home page of a popular search engine site may be extremely popular, but it is not interesting, because most users already know about it. To avoid reporting the search engine home page URL as an interesting network resource identifier, the search engine home page URL is stored in an exclusion list and all network resource identifiers in the exclusion list are excluded from consideration as interesting.

In an embodiment, the decision criteria comprise determining which network resource identifiers are most often accessed in a specified period of time by a subset of computers within a network, where a specified number of computers are in the subset. For example, if ten computers, comprising a subset of 10 of 100 total computers within a network, are accessing three particular network resource identifiers repeatedly, then those three particular network resource identifiers are deemed as interesting to the subset and might be interesting to the total set of computers. The specified number in this example is 10, and that number is considered large enough in proportion to the total computers for popular network resource identifiers to qualify as interesting, yet not so large that the popular network resource identifiers ought to be on the exclusion list because they are widely known.

In an embodiment, the decision criteria may comprise automatically loading an electronic document associated with a network resource identifier, parsing content of the electronic document, and matching the parsed content to one or more lists of known popular keywords. For example, particular keywords may be known to be newsworthy at a particular period in time and an administrator can configure the keywords in a list in database 134 or otherwise managed by bookmark processing logic 132. The list of keywords may be updated periodically in response to changes in then-current news or other information relevant to whether network resource identifiers are interesting.

Thus, in an embodiment, the bookmark processing logic 132 is configured to determine that URLs are interesting by processing weight values based on the number of times each URL has been visited; thus, the URLs are associated with a popularity value.

In another embodiment, a keyword list is configured in database 134 or otherwise accessible to bookmark processing logic 132; the keyword list contains words that are likely to be associated with electronic documents. The database also stores keywords in association with each network resource identifier that is in the database. The bookmark processing logic 132 searches the stored keywords for the words in the keyword list and forms a list of all network resource identifiers that have the keywords and are popular as indicated by the weight values or counters. For example, if a keyword is "blog," then by identifying all web pages that contain the word "blog" in either the page title or body and forming a list of such web pages that are popular as indicated by the counters, the bookmark processing logic 132 can show a list of the most popular "blogs" visited by users in the network.

Step 412 comprises generating and providing a report of the interesting network resource identifiers. In an embodiment, bookmark processing logic 132 generates a report and provides the report to one of the computers 120, 122, 124. For example a report may be sent to an administrator and displayed on the computers or printed at a network-attached printer. Alternatively, other responsive actions may be performed, as indicated in step 416.

For example, in step 414, a social bookmarking site is updated with one or more new records of one or more interesting network resource identifiers. In the context of FIG. 1, bookmark processing logic 132 can generate an HTTP POST request containing one or more network resource identifiers, organized according to a format compatible with a server or application of social bookmarking website 104, and send the POST request to the website. The specific format of the request may vary according to how the social bookmarking website 104 or an application of the site accepts data values. For example, a parameterized URL can be used to accomplish the request. As a result, the social bookmarking website is automatically updated with interesting network resource identifiers that are detected based on inspecting network traffic.

In another embodiment, the bookmark processing server determines and reports on patterns and trends in accessing URLs or in keywords within the HTML documents associated with the URLs. For example, all URLs that represent searches using a particular search engine are tracked, and the bookmark processing server determines and reports on the most popular search keywords that were used in the searches. As a result, a first user can see the most popular searches that are being performed by other users in the same network.

FIG. 5 illustrates a data storage organization for a network resource identifier database in one embodiment. In an embodiment, database 134 (FIG. 1) has the structure shown in FIG. 5. In an embodiment, the database comprises a plurality of records, in which each record is associated with a URL. Columns in the database, in one embodiment, comprise a URL identifier column 502, URL column 504, counter column 506, metadata column 508, and time to live column 510. The URL identifier column 502 stores a numeric or alphanumeric identifier or key for a particular record to uniquely identify the record and enable rapid searching. The URL column 504 contains text of a network resource identifier such as a URL, URI, etc. The counter column 506 stores a counter indicating the number of times that the associated network resource identifier has been requested or accessed.

The metadata column 508 stores one or more values (or key-value pairs) relating to the network resource identifier. Examples of metadata values include a WBRS value, URL age value (e.g., the amount of time for which the URL is known to have been available in the Internet), the date and time at which the associated URL was posted to a social bookmarking website, etc.). In an embodiment, metadata column 508 also stores any keywords that are in the received report messages, for future use as tags that users can search on.

The time to live column 510 specifies an expiration time; when the expiration time occurs, the bookmark processing logic 132 removes the associated record from the database.

In other embodiments, different variations of data associated with network resource identifiers may be used.

In an embodiment, firewall 108 comprises a Messaging Gateway Appliance (MGA) from IronPort Systems, Inc., a Cisco company. The MGA incorporates an HTTP proxy. The primary purpose of the HTTP proxy is to prevent users from clicking on URLs received in emails, or entering URLs in their browsers, that are associated with spyware, adware, or other malicious software that might be automatically downloaded and infect the enterprise network. IronPort maintains a "bad URL" tracking system at its operations center and periodically securely pushes out blacklists and whitelists of URLs to the MGAs that are deployed at customer sites in the field. Each URL is associated with a Web Reputation Score (WBRS) of −10 to +10 and local policy in a customer MGA can determine whether an enterprise user is allowed to access a URL having a WBRS below a specified threshold. IronPort's operations center computes the WBRS based on many metrics.

In an embodiment, because the IronPort MGA is at the edge of the network 110 and screens all URLs, only one MGA configured with network resource identifier processing logic 140 is used for each point at which the network is linked to the public Internet.

In an embodiment, bookmark processing logic 132 uses the WBRS value of a URL to weight whether a URL is deemed interesting. For example, the bookmark processing logic 132 might not want to report a URL with a low WBRS score to a social bookmarking site even if many enterprise users are attempting to access it. Or, if a moderate number of enterprise users are accessing a URL that has a high WBRS value, then the determination of step 410 may be given greater weight on the basis of the WBRS value.

In an alternate embodiment, each of the network elements 112, 114, 116, 118 comprises network resource processing logic 140, but the firewall 108 (an MGA) does not comprise such logic. For each URL that is received from the network processing logic 140 from any of the network elements, the bookmark processing logic 132 sends a scoring request to the MGA, receives a WBRS score in return, and decides whether to report the URL to the social bookmarking site 104 based on whether the received WBRS value passes a local policy threshold.

3.0 Implementation Mechanisms—Hardware Overview

Figure 6:
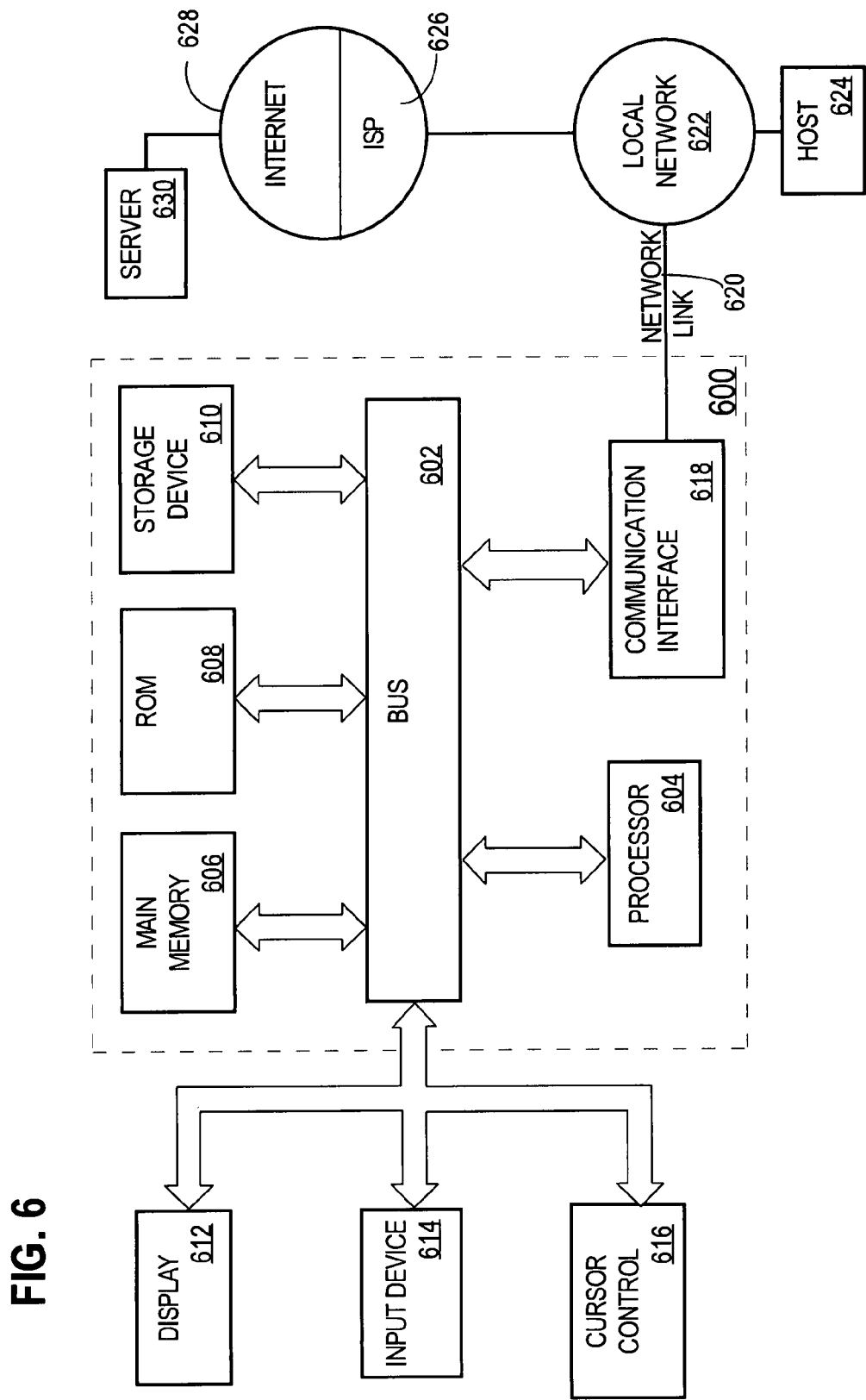
FIG. 6 illustrates a computer system upon which an embodiment of the bookmark processing logic may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for network bookmarking based on network traffic. According to one embodiment of the invention, network bookmarking based on network traffic is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile storage media and volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for network bookmarking based on network traffic as described herein.

The received code may be executed by processor 604 as it is received, and/or stored in storage device 610, or other non-volatile storage for later execution.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
a first packet data router, comprising:
one or more ingress network interfaces that are coupled to a data network for receiving one or more data packets therefrom;
one or more egress network interfaces that are coupled to a data network for sending one or more data packets thereto;
one or more processors;
a packet switching system coupled to the one or more processors and to the ingress network interfaces and to the egress network interfaces and configured to receive one of the data packets from one of the ingress network interfaces, determine next hop for the one of the data packets, and forward the one of the data packets toward the next hop on a selected one of the egress interfaces;
first network resource tracking logic in the router and encoded in a computer-readable storage medium for execution and when executed by the one or more processors operable to perform:
monitoring the one or more data packets as the one or more data packets pass through the first packet data router;

detecting one or more network resource identifiers within the one or more data packets;

forming one or more network resource identifier report messages that carry the one or more network resource identifiers;

forwarding the one or more network resource identifier report messages to a bookmark processing server;

wherein the bookmark processing server comprises bookmark processing logic encoded in a computer-readable storage medium for execution and when executed is operable to perform:

receiving the one or more network resource identifier report messages and storing one or more records of each of the one or more network resource identifiers carried therein;

creating and storing counters in the records, wherein the counters identify numbers of times that associated network resource identifiers were requested;

determining one or more interesting network resource identifiers based on the records and one or more decision steps;

wherein a network resource identifier is an interesting network resource identifier if the network resource identifier was repeatedly accessed by a subset of computers in the data network, wherein the subset of computers is at least 10% of a total quantity of computers but less than a specified percentage at which the network resource identifier is deemed widely known;

generating and providing a report of the interesting network resource identifiers.

2. The system of claim 1, wherein the one or more decision steps comprise determining the highest counters.

3. The system of claim 1, wherein the bookmark processing logic further comprises logic which when executed causes creating and storing a list of excluded network resource identifiers, determining whether the one or more network resource identifiers carried in the one or more network resource identifier report messages are in the list of excluded network resource identifiers, and not storing the network resource identifiers when the one or more network resource identifiers carried in the one or more network resource identifier report messages are in the list of excluded network resource identifiers.

4. The system of claim 3, wherein the bookmark processing logic further comprises logic which when executed causes:

storing one or more words of interest in a searchable data store;

receiving user input specifying a search for one or more search terms;

searching the data store to identify one or more network resource identifiers associated with any of the one or more words of interest that match the one or more search terms;

providing a report of the one or more network resource identifiers associated with any of the one or more words of interest that match the one or more search terms.

5. The system of claim 1, further comprising a second packet data router coupled through the network to the first packet data router and comprising second network resource tracking logic encoded in a computer-readable storage medium for execution and when executed by the one or more processors operable to perform monitoring second one or more data packets as the second one or more data packets pass through the second data router; detecting other network resource identifiers within the second one or more data packets; forming one or more other network resource identifier report messages that carry the one or more other network resource identifiers; forwarding the one or more other network resource identifier report messages to the bookmark processing server.

6. The system of claim 1 further comprising a plurality of other packet data routers coupled to the first packet data router in other locations in the network and each configured to forward to the bookmark processing server one or more other network resource identifier report messages carrying one or more other network resource identifiers detected in other data packets passing through the other packet data routers.

7. The system of claim 1 wherein the bookmark processing server further comprises logic which when executed causes creating and sending to a social bookmarking website a request to enter a uniform resource locator (URL) into a data store of the social bookmarking website, where the request comprises one or more of the network resource identifiers.

8. The system of claim 1 wherein the network resource identifiers are uniform resource locators (URLs).

9. The system of claim 1 wherein the first packet data router comprises any of a router or packet data switch.

10. The system of claim 1 wherein the bookmark processing server further comprises means for creating and sending to a social bookmarking website a request to enter a uniform resource locator (URL) into a data store of the social bookmarking website, where the request comprises one or more of the network resource identifiers.

11. The system of claim 1, wherein the first network resource tracking logic comprises logic which when executed causes:

retrieving, for a particular one of the network resource identifiers, online content associated with the particular one of the network resource identifiers;

identifying one or more words of interest in the online content;

providing the one or more words of interest to the bookmark processing server in association with one of the network resource identifier report messages.

12. A non-transitory computer-readable volatile or non-volatile storage medium encoded with first network resource tracking logic comprising one or more sequences of instructions, which when executed by one or more processors of a database router, cause:

monitoring one or more data packets as the one or more data packets pass through the router;

detecting one or more network resource identifiers within the one or more data packets;

forming one or more network resource identifier report messages that carry the one or more network resource identifiers;

forwarding the one or more network resource identifier report messages to a bookmark processing server;

wherein the bookmark processing server comprises one or more sequences of instructions, which when executed cause:

receiving the one or more network resource identifier report messages and storing one or more records of each of the one or more network resource identifiers carried therein;

creating and storing counters in the records, wherein the counters identify numbers of times that associated network resource identifiers were requested;

determining one or more interesting network resource identifiers based on the records and one or more decision steps;

wherein a network resource identifier is an interesting network resource identifier if the network resource identifier was repeatedly accessed by a subset of computers in the data network, wherein the subset of computers is at least 10% of a total quantity of computers but less than a specified percentage at which the network resource identifier is deemed widely known;
generating and providing a report of the interesting network resource identifiers.

13. The computer-readable medium of claim 12, wherein the one or more decision steps comprise determining the highest counters.

14. The computer-readable medium of claim 12, wherein the bookmark processing logic further comprises instructions, which when executed, cause the one or more processors to perform: creating and storing a list of excluded network resource identifiers, determining whether the one or more network resource identifiers carried in the one or more network resource identifier report messages are in the list of excluded network resource identifiers, and not storing the network resource identifiers when the one or more network resource identifiers carried in the one or more network resource identifier report messages are in the list of excluded network resource identifiers.

15. The computer-readable medium of claim 14, wherein the bookmark processing logic further comprises instructions, which when executed, cause the one or more processors to perform:
storing one or more words of interest in a searchable data store;
receiving user input specifying a search for one or more search terms;
searching the data store to identify one or more network resource identifiers associated with any of the one or more words of interest that match the one or more search terms;
providing a report of the one or more network resource identifiers associated with any of the one or more words of interest that match the one or more search terms.

16. The computer-readable medium of claim 12, further comprising a second packet data processing logic communicating with a second network resource tracking logic encoded in the storage medium, comprising one or more sequences of instructions, which when executed by the one or more processors, cause the one or more processors to perform: monitoring second one or more data packets as the second one or more data packets pass through the second data routers; detecting other network resource identifiers within the second one or more data packets; forming one or more other network resource identifier report messages that carry the one or more other network resource identifiers; forwarding the one or more other network resource identifier report messages to the bookmark processing server.

17. A data processing system, comprising:
a first packet data router, comprising:
one or more ingress network interfaces that are coupled to a data network for receiving one or more data packets therefrom;
one or more egress network interfaces that are coupled to a data network for sending one or more data packets thereto;
one or more processors;
a packet switching system coupled to the one or more processors and to the ingress network interfaces and to the egress network interfaces and configured to receive one of the data packets from one of the ingress network interfaces, determine next hop for the one of the data packets, and forward the one of the data packets toward the next hop on a selected one of the egress interfaces;
a first network resource tracking logic, in the router, comprising:
means for monitoring the one or more data packets as the one or more data packets pass through the first packet data router;
means for detecting one or more network resource identifiers within the one or more data packets;
means for forming one or more network resource identifier report messages that carry the one or more network resource identifiers;
means for forwarding the one or more network resource identifier report messages to a bookmark processing server;
wherein the bookmark processing server comprises:
means for receiving the one or more network resource identifier report messages and storing one or more records of each of the one or more network resource identifiers carried therein;
means for creating and storing counters in the records, wherein the counters identify numbers of times that associated network resource identifiers were requested;
means for determining one or more interesting network resource identifiers based on the records and one or more decision mechanisms;
wherein a network resource identifier is an interesting network resource identifier if the network resource identifier was repeatedly accessed by a subset of computers in the data network, wherein the subset of computers is at least 10% of a total quantity of computers but less than a specified percentage at which the network resource identifier is deemed widely known;
means for generating and providing a report of the interesting network resource identifiers.

18. The system of claim 17, wherein the one or more decision mechanisms comprise means for determining the highest counters.

19. The system of claim 17, wherein the bookmark processing server further comprises means for creating and storing a list of excluded network resource identifiers, means for determining whether the one or more network resource identifiers carried in the one or more network resource identifier report messages are in the list of excluded network resource identifiers, and means for not storing the network resource identifiers when the one or more network resource identifiers carried in the one or more network resource identifier report messages are in the list of excluded network resource identifiers.

20. The system of claim 17, wherein the first packet data router further comprises:
means for retrieving, for a particular one of the network resource identifiers, online content associated with the particular one of the network resource identifiers;
means for identifying one or more words of interest in the online content;
means for providing the one or more words of interest to the bookmark processing server in association with one of the network resource identifier report messages.

21. The system of claim 20, wherein the bookmark processing logic further comprises:
means for storing the one or more words of interest in a searchable data store;
means for receiving user input specifying a search for one or more search terms;

means for searching the data store to identify one or more network resource identifiers associated with any of the one or more words of interest that match the one or more search terms;

means for providing a report of the one or more network resource identifiers associated with any of the one or more words of interest that match the one or more search terms.

22. The system of claim 17, further comprising a second packet data router coupled through the network to the first packet data router and comprising second network resource tracking logic means for performing monitoring second one or more data packets as the second one or more data packets pass through the second data router; means for detecting other network resource identifiers within the second one or more data packets; means for forming one or more other network resource identifier report messages that carry the one or more other network resource identifiers; means for forwarding the one or more other network resource identifier report messages to the bookmark processing server.

23. The system of claim 17 further comprising a plurality of other packet data routers coupled to the first packet data router in other locations in the network and comprising means for forwarding to the bookmark processing server one or more other network resource identifier report messages carrying one or more other network resource identifiers detected in other data packets passing through the other packet data routers.

24. A method, comprising:
  in a first packet data router, comprising one or more ingress network interfaces that are coupled to a data network for receiving one or more data packets therefrom;
  one or more egress network interfaces that are coupled to a data network for sending one or more data packets thereto;
  one or more processors;
  a packet switching system coupled to the one or more processors and to the ingress network interfaces and to the egress network interfaces and configured to receive one of the data packets from one of the ingress network interfaces, determine next hop for the one of the data packets, and forward the one of the data packets toward the next hop on a selected one of the egress interfaces;
  first network resource tracking logic, in the router, performing:
    monitoring the one or more data packets as the one or more data packets pass through the first packet data router;
    detecting one or more network resource identifiers within the one or more data packets;
    forming one or more network resource identifier report messages that carry the one or more network resource identifiers;
    forwarding the one or more network resource identifier report messages to a bookmark processing server;
  in the bookmark processing server:
    receiving the one or more network resource identifier report messages and storing one or more records of each of the one or more network resource identifiers carried therein;
    creating and storing counters in the records, wherein the counters identify numbers of times that associated network resource identifiers were requested;
    determining one or more interesting network resource identifiers based on the records and one or more decision steps;
    wherein a network resource identifier is an interesting network resource identifier if the network resource identifier was repeatedly accessed by a subset of computers in the data network, wherein the subset of computers is at least 10% of a total quantity of computers but less than a specified percentage at which the network resource identifier is deemed widely known;
    generating and providing a report of the interesting network resource identifiers;
    wherein the method is performed by one or more processors.

25. The method of claim 24 further comprising, in the bookmark processing server, creating and sending to a social bookmarking website a request to enter a uniform resource locator (URL) into a data store of the social bookmarking website, where the request comprises one or more of the network resource identifiers.

* * * * *